May 12, 1925.
J. SCHOLL ET AL
1,537,707
BEET TOPPING MACHINE
Filed Nov. 5, 1924
2 Sheets-Sheet 1
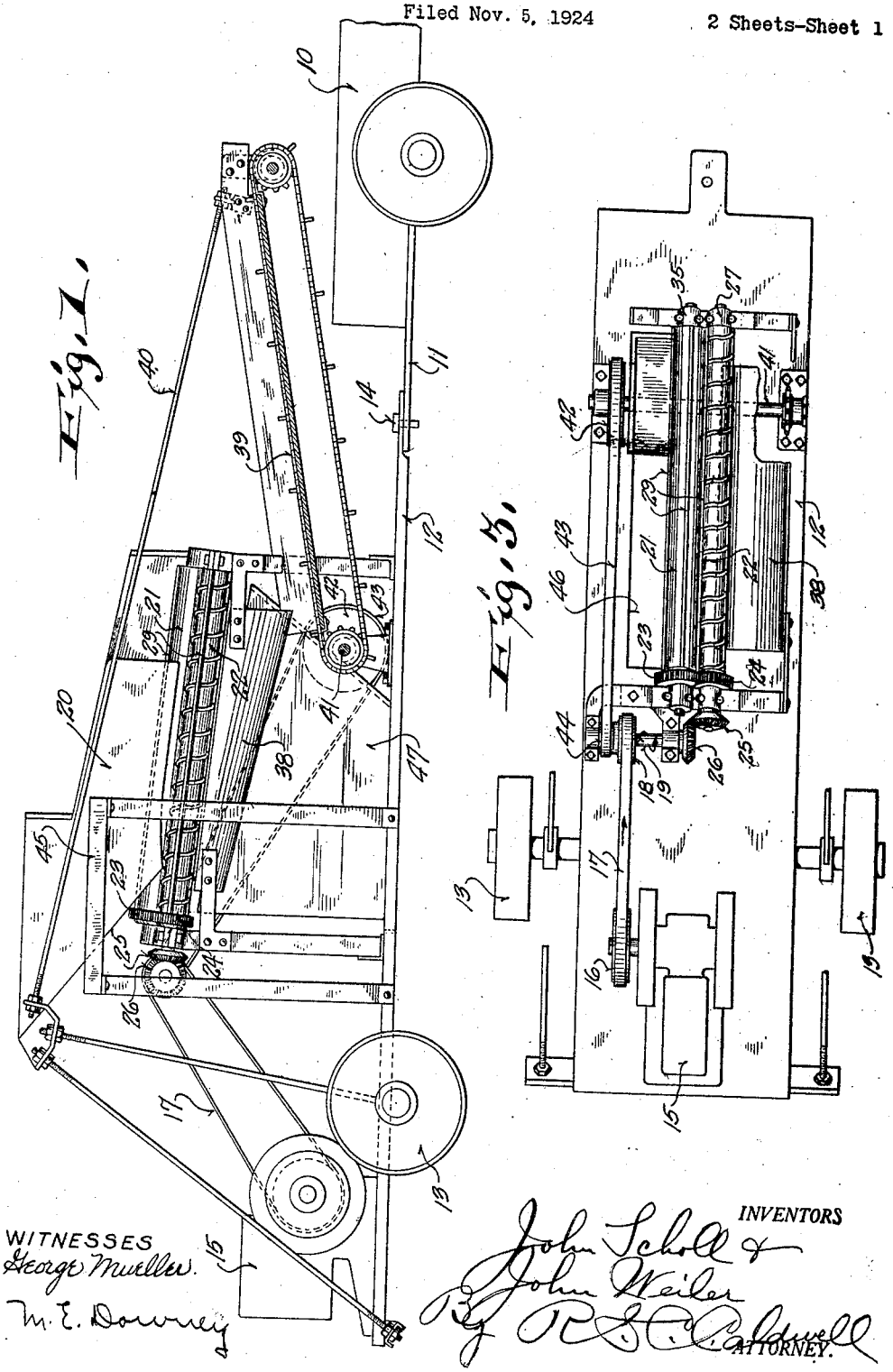
WITNESSES
George Mueller.
M. E. Downey
INVENTORS
John Scholl &
John Weiler
BY R. S. Caldwell
ATTORNEY

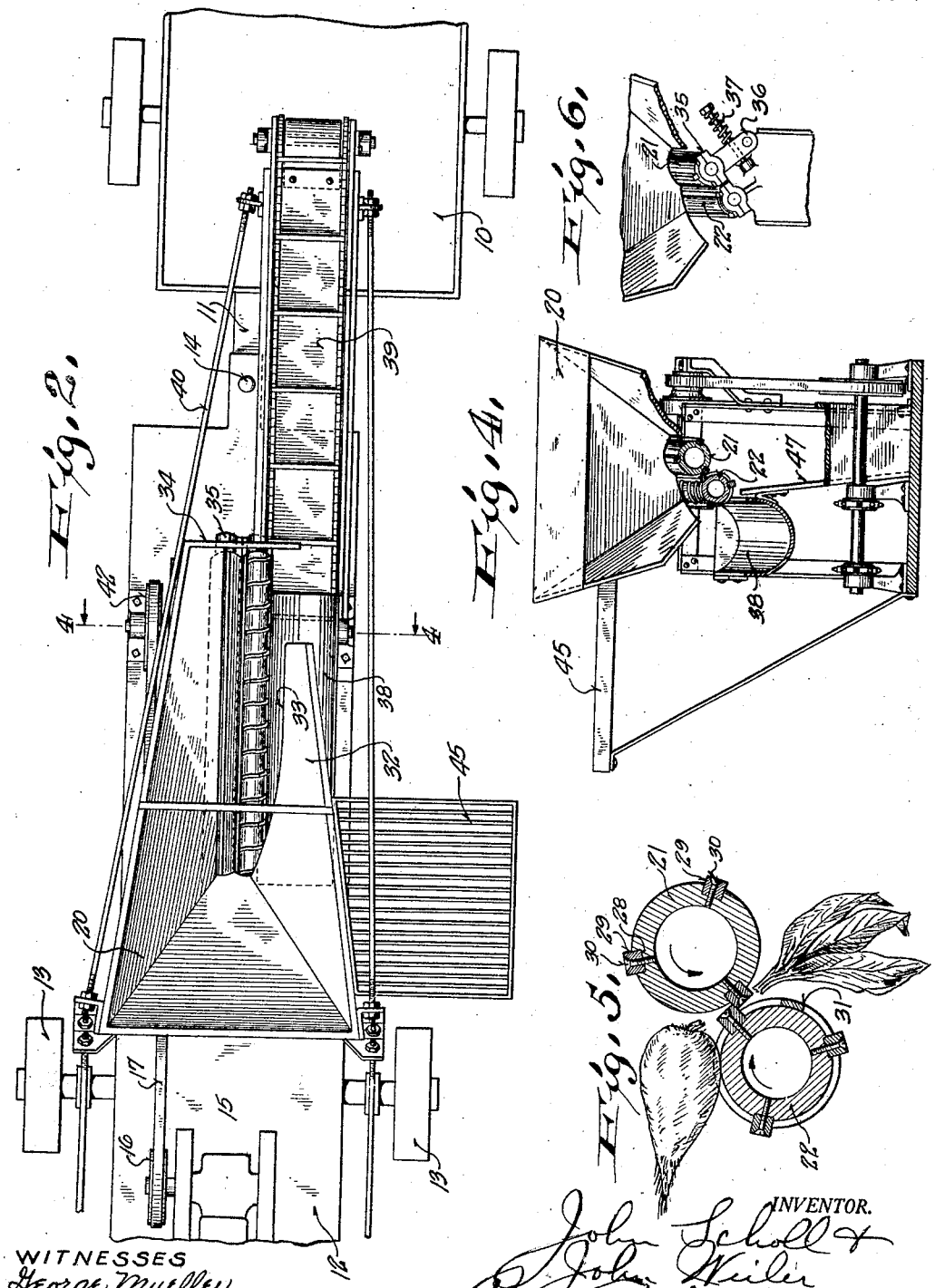

Patented May 12, 1925.

1,537,707

UNITED STATES PATENT OFFICE.

JOHN SCHOLL AND JOHN WEILER, OF BELGIUM, WISCONSIN.

BEET-TOPPING MACHINE.

Application filed November 5, 1924. Serial No. 747,899.

*To all whom it may concern:*

Be it known that we, JOHN SCHOLL and JOHN WEILER, both citizens of the United States, and residents of Belgium, in the county of Ozaukee and State of Wisconsin, have invented new and useful Improvements in Beet-Topping Machines, of which the following is a description, reference being had to the accompanying drawings which are a part of this specification.

The invention relates to machines for topping beets and other vegetables.

The object of the invention is to provide a beet topping machine in which the tops are severed between a pair of rolls, the rolls being disposed one above the other to permit the lateral discharge of the vegetables as soon as they are topped, thereby minimizing bruising of the beets and affording a relatively large capacity by avoiding the congestion and sluggish movement of the beets which obtains in the type of topping machine in which the beets are required to traverse the length of the rolls before leaving them.

The invention further consists in the several features hereinafter set forth and more particularly defined by the annexed claims.

In the accompanying drawings, Fig. 1 is a side elevation of the device embodying the invention, parts being broken away and parts being shown in section;

Fig. 2 is a plan view thereof, parts being broken away;

Fig. 3 is a plan view of the topping rolls and their supporting structure;

Fig. 4 is a sectional view taken on the line 4—4 of Fig. 2;

Fig. 5 is a detail transverse sectional view through the rolls; and

Fig. 6 is a fragmentary detail view of the roll mounting.

The organization of the machine embodying the invention contemplates portability for use in the field, and is generally similar to that disclosed in Patent No. 1,432,912, to John Scholl and Richard Parlow, but incorporating improvement hereinafter described.

In the drawings, the numeral 10 designates a wagon provided with a draw bar 11 to which a frame 12, supported intermediate its ends on wheels 13, is coupled by a king bolt 14. The frame 12 has an engine 15 mounted thereon, whose drive pulley 16 is connected by a belt 17 to a pulley 18 on a shaft 19.

A hopper 20 is mounted on the frame, and topping rolls 21 and 22, preferably supported on an incline, are located at the bottom of the hopper. These rolls 21 and 22 are drivingly connected together by gears 23 and 24 to rotate in opposite directions with their meeting peripheral portions moving downwardly, and the roll 22 is driven from the shaft 19 by a gear 25 on said roll meshing with a gear 26 on shaft 19.

The invention contemplates the lateral discharge of the beets or other vegetables as soon as the tops are severed, and for this purpose the roll 21 is disposed above the roll 22, as seen in Figs. 4 and 5, to prevent the retention of the beets or other vegetables between them after the topping operation.

The rolls 21 and 22 are preferably formed of tubular metallic shells having stub shafts 27 secured at their ends to be journalled in the roll bearings. Equally spaced longitudinally extending keyways 28 are cut in each shell to receive cutting bars 29 held therein by screws 30 tapped into the shell. The roll 22 is preferably provided with curved segmental members 31 extending between the cutting bars 29 to form helical feeding ribs insuring the progress of the beets along the rolls. The cutting bars 29 co-operate in the manner shown in Fig. 5, in which the cutting bars on roll 22 follow those on the roll 21 as they enter the space between the rolls. This arrangement is preferred since the back-lash between the gears 23 and 24 will permit the cutting bars to engage, whereas the opposite arrangement would tend to cause their separation. The rolls 21 and 22 are made of relatively small diameter in order to top closely and to facilitate the discharge of the beets after topping. The side wall 32 of the hopper 20 adjacent the lower roll is cut away at 33 to provide a gradually increasing discharge passage as the beets move down on the rolls, thereby preventing the discharge of newly introduced beets, and an end wall 34 is provided on the hopper at the lower end of the rolls. The side wall 32 preferably terminates short of the end wall 34 to afford unrestricted lateral discharge of topped beets at the lower end of the rolls.

In order to prevent breakage of the rolls when loose rock or other foreign material clinging to the beets enters between the rolls, the journals 35 for the roll 21 are mounted on swinging arms 36 which are yieldingly held in operative position by means of springs 37, as seen in Fig. 6, said springs permitting the arms to swing for separating the rolls. However, the yielding roll mounting may be dispensed with if the construction is sufficiently rugged to permit crushing of the stones or other hard objects as they pass between the rolls.

An inclined chute 38 is supported below and laterally of the lower roll 22 to receive the beets discharged from the rolls, and a conveyor or elevator 39 has its lower end supported below the discharge end of the chute 38 and extends forwardly and upwardly above the wagon box, where it is supported in a suitable manner, as by suspension rods 40. The conveyor 39 includes a sprocket-bearing shaft 41 at its lower end provided with a pulley 42 driven by a belt 43 from a pulley 44 on the shaft 19.

A slatted horizontal platform 45 is supported adjacent one side of the hopper 20 to receive the beets before they are placed in the hopper. An opening 46 may be provided in the frame 12 through which the tops of the beets may fall to the ground and through which they may be guided by a chute 47. The term "hopper" in this specification has been used to include what might be termed a chute in which the topping rolls are disposed.

In operation, the harvested beets are deposited on the slatted platform 45 where the operator shakes off most of the loose soil and removes stones and other foreign matter before placing the beets in the hopper 20. When the beets reach the rolls, the leafy tops are drawn between the rolls 21 and 22 where they are severed by the cutting bars 29 of the rolls, the beets being simultaneously moved forward by the feeding rib on roll 22 to make room for following beets. As soon as the beets are topped they become overbalanced and are laterally discharged from the lower roll 21 into the chute 38 in which they descend forwardly onto the conveyor 39 which transfers them to the wagon. The tops are discharged to the ground through the opening 46 in the frame, and the machine is intermittently moved along the field to keep pace with the harvesters.

The lateral discharge of the beets from the rolls as soon as they are topped minimizes bruising of the beets and serves to increase the capacity of the machine.

What we claim as new and desire to secure by Letters Patent is:

1. In a beet topping machine, the combination with a beet-receiving hopper, of a pair of beet-supporting rolls at the bottom thereof rotatable in opposite directions to receive the tops of the beets between them from above, and cutting means disposed on said rolls, said rolls being disposed one above the other to permit the lateral and downward discharge of the beets from the lower roll as soon as they are topped.

2. In a beet topping machine, the combination with a beet-receiving hopper, of a pair of rolls at the bottom thereof along and above which the beets are supportingly fed, and top-severing means secured to said rolls, one of said rolls being disposed below the other, whereby the beets fall laterally from the lower roll after topping.

3. A beet topping machine comprising a pair of beet-supporting rolls rotatable in opposite directions to sever the beet tops between them, one of said rolls being disposed laterally of and below the other to permit the lateral discharge of the beets from the lower roll after being topped.

4. In a beet topping machine, the combination of a pair of inclined beet-supporting rolls and feeding means carried by the rolls to move the beets downwardly thereon, one of said rolls being disposed laterally of and below the other to effect the lateral discharge of the beets from the lower roll as soon as they are topped.

5. In a beet topping machine, the combination with a hopper, of a pair of inclined beet-supporting topping rolls at the bottom thereof, and means for feeding the beets downwardly along the rolls during topping, one of said rolls being disposed below the other, whereby the beets are discharged laterally from the lower roll after the tops are severed.

6. In a beet topping machine, the combination of a pair of topping rolls along which the beets are fed, one of said rolls being disposed below the other, and a hopper disposed above said rolls and having its side walls extending adjacent the rolls, one of said walls being spaced from the lower roll to provide a discharge opening increasing in width in the direction in which the beets are fed, said beets being discharged laterally from the lower roll after the tops are severed.

7. In a beet topping machine, the combination of a pair of topping rolls along which the beets are fed, one of said rolls being disposed below the other, a hopper disposed above said rolls and having its side walls extending adjacent the rolls, one of said walls being spaced from the lower roll to provide a discharge opening increasing in width in the direction in which the beets are fed, said beets being discharged laterally from the lower roll after the tops are severed, and an inclined chute extending below and laterally of the lower roll to receive the topped beets dropping from the side of the lower roll.

8. In a beet topping machine, the combination of a pair of topping rolls, a pair of gears carried at adjacent ends of said rolls and meshing to effect the rotation of the rolls in opposite directions, a driving connection to one of said rolls, longitudinally-extending cutters carried by said rolls and co-operating to effect topping of the beets, a cutter on said driving roll being adapted to follow a corresponding cutter on the other roll whereby the back lash in said driving gears will permit said cutters to engage at a region between the rolls.

9. In a beet topping machine, the combination of a pair of inclined beet-supporting rolls along which beets are downwardly fed and rotatable in opposite directions to sever the beet tops between them, one of said rolls being disposed laterally of and below the other to permit lateral discharge of the beets from the lower roll as soon as they are topped, and a beet-receiving hopper disposed above said rolls and having a side wall cut away adjacent the lower roll to pass the discharged beets at a distance from the upper end of said rolls.

10. In a beet topping machine, the combination of a pair of inclined topping rolls along which beets are downwardly fed, one of said rolls being disposed below the other to permit lateral discharge of the beets from the lower roll after topping, a beet-receiving hopper disposed above the rolls and having a side wall adjacent the lower roll cut away to pass the beets, an inclined chute disposed below the lower roll and into which the discharged beets fall from the roll, and a conveyor at the lower end thereof for moving the beets to a receptacle.

In testimony whereof we affix our signatures.

JOHN SCHOLL.
JOHN WEILER.